United States Patent
Xu

(10) Patent No.: US 11,486,571 B2
(45) Date of Patent: Nov. 1, 2022

(54) LIGHT EMITTING FAN AND HEAT DISSIPATION DEVICE

(71) Applicant: VAST GLORY ELECTRONICS & HARDWARE & PLASTIC(HUI ZHOU) LTD., Hui Zhou (CN)

(72) Inventor: Shi Man Xu, Hui Zhou (CN)

(73) Assignee: VAST GLORY ELECTRONICS & HARDWARE & PLASTIC(HUI ZHOU) LTD., Hui Zhou (CN)

( * ) Notice: Subject to any disclaimer, the term of this patent is extended or adjusted under 35 U.S.C. 154(b) by 0 days.

(21) Appl. No.: 17/230,236

(22) Filed: Apr. 14, 2021

(65) Prior Publication Data
US 2022/0057080 A1 Feb. 24, 2022

(30) Foreign Application Priority Data

Aug. 21, 2020 (CN) .......................... 202010846889.0

(51) Int. Cl.
*F21V 33/00* (2006.01)
*G06F 1/20* (2006.01)

(52) U.S. Cl.
CPC ............ *F21V 33/0096* (2013.01); *G06F 1/20* (2013.01)

(58) Field of Classification Search
CPC ............ H05K 7/20172; F04D 25/0613; F04D 29/005; F04D 29/526; F04D 29/00; F04D 25/088; F21V 33/0052; F21V 33/0096; F21V 23/005; G06F 1/20; F21Y 2103/33; F21Y 2107/10; F21Y 2115/10
See application file for complete search history.

(56) References Cited

U.S. PATENT DOCUMENTS

| 2003/0190884 A1* | 10/2003 | Lee ..................... H05K 7/20209 454/184 |
| 2013/0156616 A1* | 6/2013 | Chang ................. F04D 29/624 427/98.8 |
| 2019/0063740 A1* | 2/2019 | Huang .................. F04D 29/005 |
| 2020/0271131 A1* | 8/2020 | Kim ...................... F04D 29/703 |
| 2020/0291949 A1* | 9/2020 | Kim ...................... F04D 25/064 |
| 2020/0332804 A1* | 10/2020 | Lin ...................... F04D 29/005 |
| 2021/0102547 A1* | 4/2021 | Tsung-Wei ............ F04D 29/522 |

FOREIGN PATENT DOCUMENTS

| CN | 207297414   | * | 5/2018  | ............ F04D 25/08 |
| CN | 208396966 U | * | 1/2019  | ............ F04D 25/08 |
| CN | 208474179   | * | 2/2019  | ........... F04D 19/002 |
| CN | 208534841   | * | 2/2019  | ........... F04D 19/002 |
| CN | 211082324   | * | 7/2020  | ............ F04D 25/08 |
| EP | 3613989 A1  | * | 2/2020  | ........... F04D 19/002 |

\* cited by examiner

*Primary Examiner* — Fatima N Farokhrooz
(74) *Attorney, Agent, or Firm* — Maschoff Brennan

(57) ABSTRACT

A light emitting fan includes a frame, a circuit board, an impeller, a decorative board, a light emitting component, and a light guiding component. The circuit board is disposed on the frame. The impeller includes a hub and blades connected to the hub. The insertion hole has an end connected to an outer top surface of the hub and extends towards the circuit board. The decorative board is fixed to the frame and located farther away from the circuit board than the outer top surface of the hub. The light emitting component is disposed on the circuit board. The light guiding component is inserted into the insertion hole of the hub. Light emitted by the light emitting component is incident on the decorative board via the light guiding component.

15 Claims, 14 Drawing Sheets

LIGHT EMITTING FAN AND HEAT DISSIPATION DEVICE

CROSS-REFERENCE TO RELATED APPLICATIONS

This non-provisional application claims priority under 35 U.S.C. § 119(a) on Patent Application No(s). 202010846889.0 filed in China on Aug. 21, 2020, the entire contents of which are hereby incorporated by reference.

TECHNICAL FIELD

The disclosure relates to a fan and a heat dissipation device, more particularly to a light emitting fan and a heat dissipation device including the same.

BACKGROUND

As the performance of an electronic device increases, more heat is generated therefrom and thus increases the temperature of the electronic device. If the heat is unable to be effectively dissipated, the performance and reliability of the electronic device may be reduced. In order to effectively dissipate the heat generated by the electronic device, a heat dissipation device, such as a fan, is adopted to ensure that the electronic device operates in a suitable temperature.

Some fans not only can cool the electronic device, but also provides a visual effect by emitting light. In general, a light emitting diode is disposed in such fan, and light emitted by the light emitting diode is directly incident on a hub of the fan or a decorative board disposed on the hub so as to provide the visual effect. However, due to the characteristic of the light emitting diode, light emitted by the light emitting diode focuses on a certain spot of the hub or the decorative board and is unable to be uniformly projected on the hub or the decorative board. Although increasing the distance between the light emitting diode and the hub or the decorative board can solve the aforementioned issue, the overall size of the fan may be increased accordingly, causing the fan to be difficult to be applied in a thin electronic device. Therefore, how to solve the aforementioned issue is one of crucial topics in this field.

SUMMARY

The disclosure provides a light emitting fan and a heat dissipation device which allows the light emitted by the light emitting diode to be uniformly projected on the decorative board.

One embodiment of the disclosure provides a light emitting fan. The light emitting fan includes a frame, a circuit board, an impeller, a decorative board, at least one light emitting component, and a light guiding component. The circuit board is disposed on the frame. The impeller includes a hub and a plurality of blades. The hub is rotatably disposed on the frame. The hub has an outer top surface, an outer annular surface, and at least one insertion hole. The outer top surface faces away from the circuit board, the outer annular surface is connected to the outer top surface, and the blades are connected to the outer annular surface of the hub. An end of the insertion hole is connected to the outer top surface, and the insertion hole extends towards the circuit board. The decorative board is fixed to the frame and located farther away from the circuit board than the outer top surface of the hub. The light emitting component is disposed on the circuit board. The light guiding component is inserted into the insertion hole of the hub. Light emitted by the light emitting component is incident on the decorative board via the light guiding component.

Another embodiment of the disclosure provides a heat dissipation device. The heat dissipation device is configured to be mounted on a heat source. The heat dissipation device includes a heat sink and a light emitting fan. The heat sink is configured to be thermally coupled with the heat source. The light emitting fan is configured to be located at a side of the heat sink located away from the heat source. The light emitting fan is configured to produce an airflow towards the heat sink. The light emitting fan includes a frame, a circuit board, an impeller, a decorative board, at least one light emitting component, and a light guiding component. The circuit board is disposed on the frame. The impeller includes a hub and a plurality of blades. The hub is rotatably disposed on the frame. The hub has an outer top surface, an outer annular surface, and at least one insertion hole. The outer top surface faces away from the circuit board, the outer annular surface is connected to the outer top surface, and the blades are connected to the outer annular surface of the hub. An end of the insertion hole is connected to the outer top surface, and the insertion hole extends towards the circuit board. The decorative board is fixed to the frame and located farther away from the circuit board than the outer top surface of the hub. The light emitting component is disposed on the circuit board. The light guiding component is inserted into the insertion hole of the hub. Light emitted by the light emitting component is incident on the decorative board via the light guiding component.

According to the light emitting fan and the heat dissipation device discussed in the above embodiments, the light guiding component is integrated on the hub of the impeller, and light emitted by the light emitting component can be incident on the light guiding component, such that the light entering into the light guiding component is diffused. Therefore, the diffused light can be uniformly guided onto the decorative board by the light guiding component, thereby achieving the uniform light emitting effect of the light emitting fan.

BRIEF DESCRIPTION OF THE DRAWINGS

The present invention will become better understood from the detailed description given herein below and the accompanying drawings which are given by way of illustration only and thus are not intending to limit the present invention and wherein.

DETAILED DESCRIPTION

Figure 1:
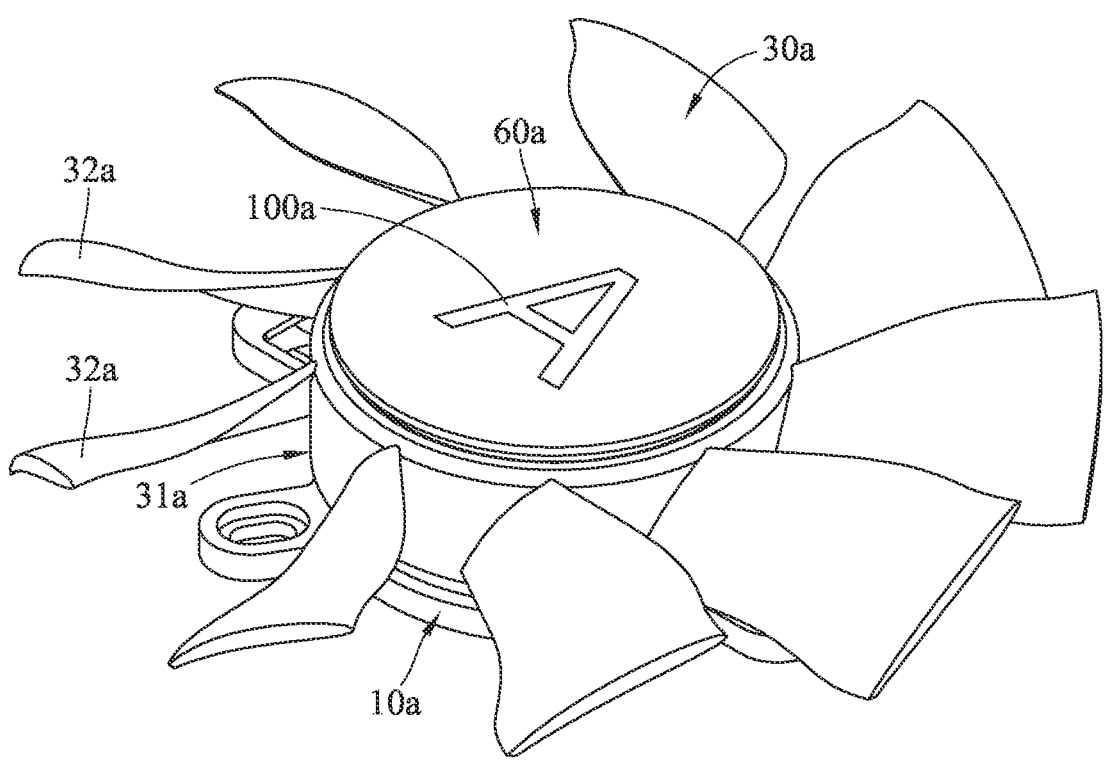
FIG. 1 is a perspective view of a light emitting fan according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
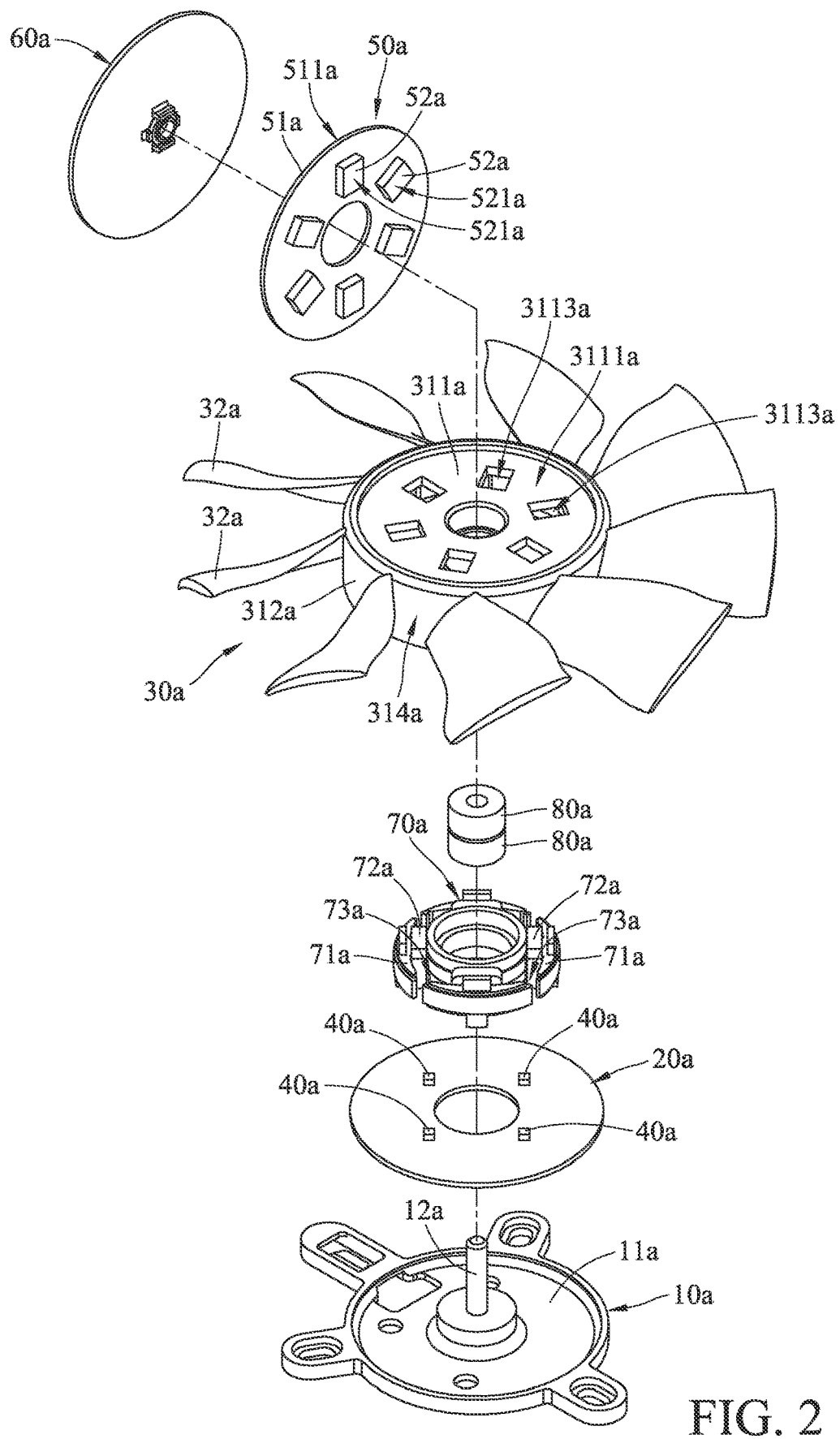
FIG. 2 is an exploded view of the light emitting fan in FIG. 1.
Figure 3:
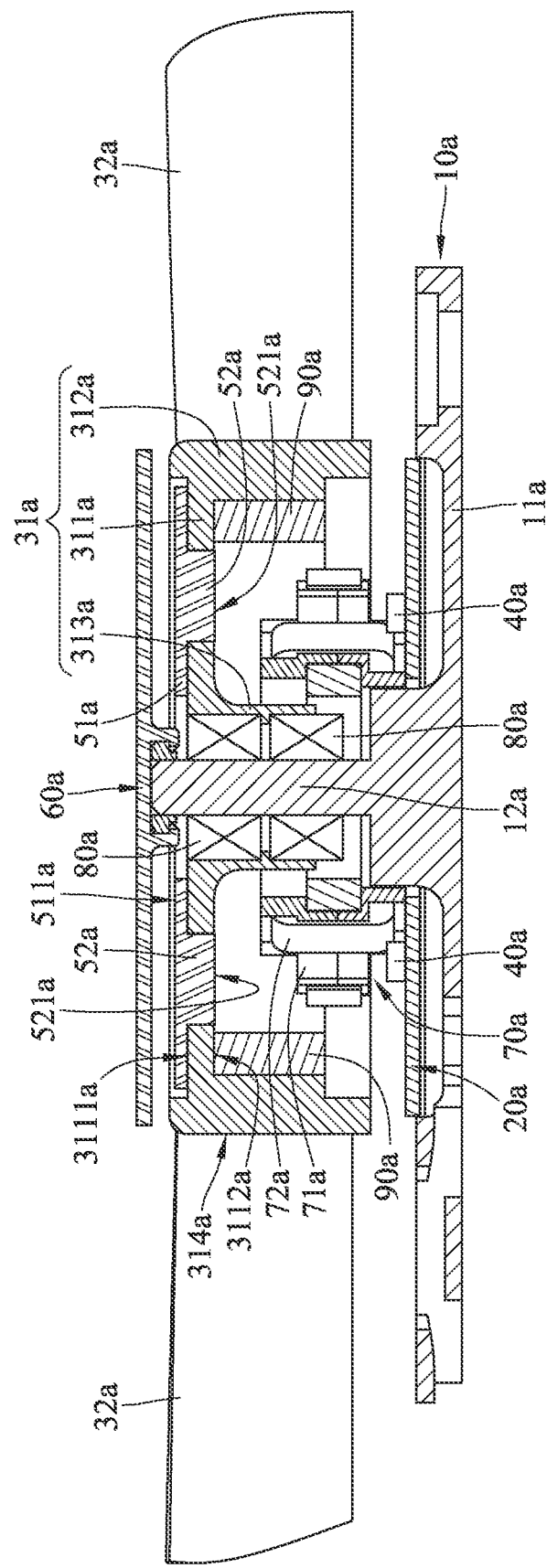
FIG. 3 is a cross-sectional view of the light emitting fan in FIG. 1.

Referring to FIGS. 1 to 3, there are shown a perspective view of a light emitting fan 1a according to a first embodiment of the disclosure, an exploded view of the light emitting fan 1a in FIG. 1, and a cross-sectional view of the light emitting fan 1a in FIG. 1.

In this embodiment, the light emitting fan 1a includes a frame 10a, a circuit board 20a, an impeller 30a, a plurality of light emitting components 40a, a light guiding component 50a, and a decorative board 60a. In this or another embodiment, the light emitting fan 1a may further include a stator 70a, two bearings 80a, and a rotor 90a.

The frame 10a includes a bottom plate portion 11a and a pillar portion 12a protruding from the bottom plate portion 11a. The pillar portion 12a of the frame 10a is disposed through the circuit board 20a, and the stator 70a is fixed on the circuit board 20a. The stator 70a has a plurality of teeth 71a and a plurality of coils 72a. Two of the teeth 71a which are located adjacent to each other together form a through hole 73a therebetween. The coils 72a are respectively wound on the teeth 71a.

The impeller 30a includes a hub 31a and a plurality of blades 32a. The hub 31a includes a top plate portion 311a, an annular wall portion 312a, and a hollow pillar portion 313a. The top plate portion 311a of the hub 31a has an outer top surface 3111a, an inner top surface 3112a and a plurality of insertion holes 3113a. The outer top surface 3111a of the top plate portion 311a is opposite to the inner top surface 3112a. The annular wall portion 312a and the hollow pillar portion 313a protrude from the inner top surface 3112a of the top plate portion 311a, and the annular wall portion 312a surrounds the hollow pillar portion 313a. The hollow pillar portion 313a of the hub 31a is rotatably disposed on the pillar portion 12a of the frame 10a via the bearings 80a, and the pillar portion 12a of the frame 10a sticks out of the outer top surface 3111a of the top plate portion 311a. The inner top surface 3112a of the top plate portion 311a faces the circuit board 20a. Each of the insertion holes 3113a has two opposite ends that are respectively connected to the outer top surface 3111a and the inner top surface 3112a; that is, the insertion holes 3113a extend towards the circuit board 20a.

In this embodiment, the hub 31a has an outer annular surface 314a on the annular wall portion 312a, and the outer annular surface 314a is connected to the outer top surface 3111a of the top plate portion 311a. The blades 32a are connected to the outer annular surface 314a of the hub 31a. The rotor 90a is, for example, a permanent magnet. The rotor 90a is disposed on a side of the annular wall portion 312a of the hub 31a located close to the stator 70a.

The light emitting components 40a are, for example, light emitting diodes. The light emitting components 40a are disposed on a surface of the circuit board 20a facing the inner top surface 3112a of the top plate portion 311a.

The light guiding component 50a, for example, includes an additive, such as light diffusion powder. The light guiding component 50a includes a plate portion 51a and a plurality of protrusion portions 52a protruding from the same surface of the plate portion 51a along the same direction. In this embodiment, the pillar portion 12a of the frame 10a is disposed through the plate portion 51a of the light guiding component 50a. The protrusion portions 52a are respectively inserted into the insertion holes 3113a, the plate portion 51a is stacked on the outer top surface 3111a of the top plate portion 311a of the hub 31a, and the top plate portion 311a of the hub 31a is located between the plate portion 51a and the circuit board 20a.

The decorative board 60a is, for example, made of a light permeable material that is transparent or translucent, such as acrylate, glass, or plastic. The decorative board 60a is fixed on an end of the pillar portion 12a that sticks out of the plate portion 51a of the light guiding component 50a, and the plate portion 51a of the light guiding component 50a is located between the decorative board 60a and the outer top surface 3111a of the top plate portion 311a. When the circuit board 20a conducts a current to the coils 72a, the rotor 90a rotates relative to the stator 70a so as to rotate the impeller 30a relative to the frame 10a. During the rotation of the impeller 30a, since the decorative board 60a is fixed on the pillar portion 12a of the frame 10a, the decorative board 60a does not rotate along with the impeller 30a.

In this embodiment, the protrusion portions 52a of the light guiding component 50a each have a light incident surface 521a, and the plate portion 51a has a light emitting surface 511a. The light incident surfaces 521a face the circuit board 20a, and the light emitting surface 511a faces the decorative board 60a. In this embodiment, the sum of the areas of the light incident surfaces 521a is smaller than the area of the light emitting surface 511a, but the disclosure is not limited thereto; in some other embodiments, the sum of the areas of the light incident surfaces may be greater than or equal to the area of the light emitting surface.

Light emitted by the light emitting components 40a is incident on the light incident surfaces 521a of the protrusion portions 52a of the light guiding component 50a via the through holes 73a of the stator 70a so as to enter into the light guiding component 50a. Then, light will be diffused in the light guiding component 50a and go out of the light guiding component 50a from the light emitting surface 511a of the plate portion 51a. Therefore, light is uniformly incident on the decorative board 60a, thereby achieving the uniform light emitting effect of the light emitting fan 1a.

In this embodiment, there is, for example, a mark 100a disposed on the decorative board 60a. For example, the mark 100a is a letter "A" as shown in FIG. 1. The mark 100a is formed on the decorative board 60a via, for example, a spray painting manner or adhering manner. Note that the form of the mark 100a is not intended to limit the disclosure and may be modified; in some other embodiments, the mark may be a trademark, a brand logo or in another suitable form. In still other embodiments, the mark 100a may be omitted.

Note that the quantities of the light emitting components 40a, the protrusion portions 52a of the light guiding component 50a, and the insertion holes 3113a of the hub 31a are not intended to limit the disclosure; in some other embodiments, the quantity of each of the light emitting component, the protrusion portion of the light guiding components, and the insertion hole of the hub may be one.

Figure 4:
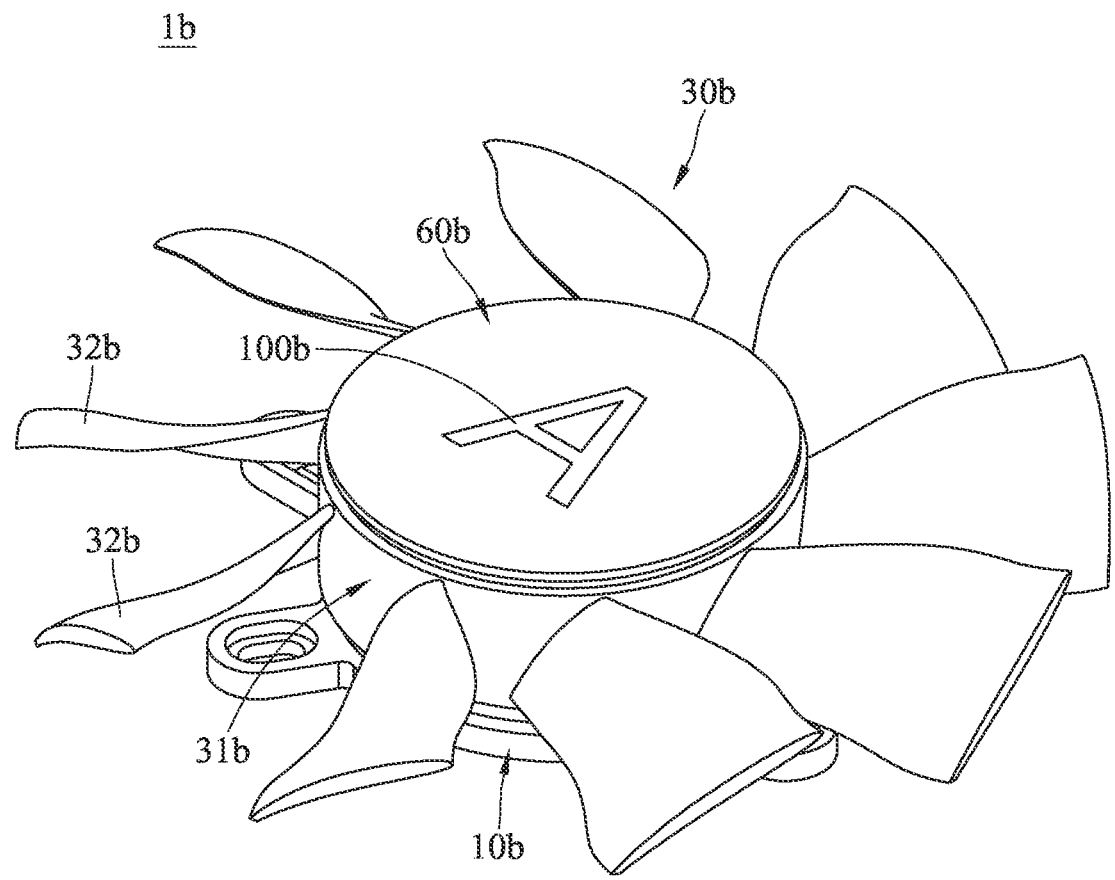
FIG. 4 is a perspective view of a light emitting fan according to a second embodiment of the disclosure.
Figure 5:
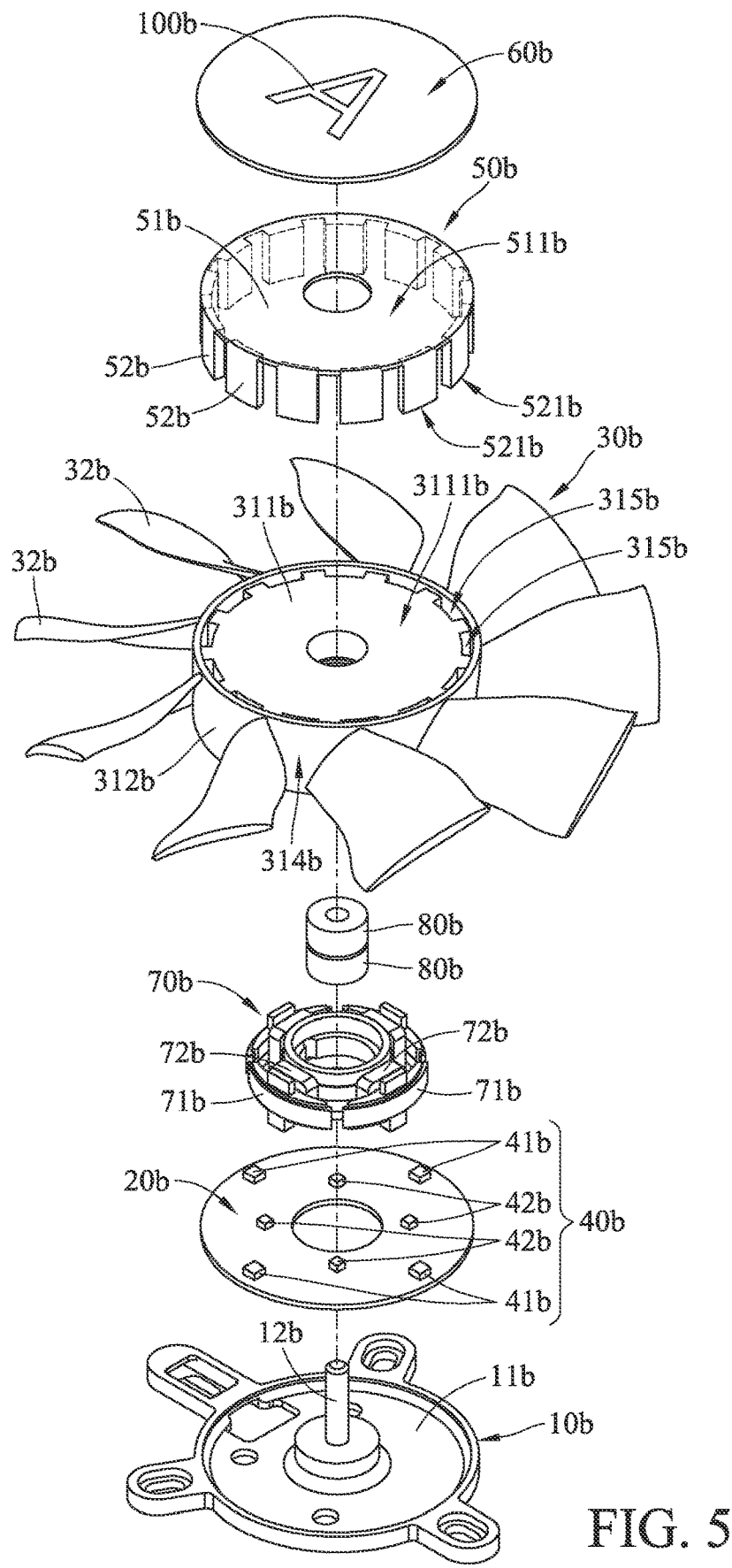
FIG. 5 is an exploded view of the light emitting fan in FIG. 4.
Figure 6:
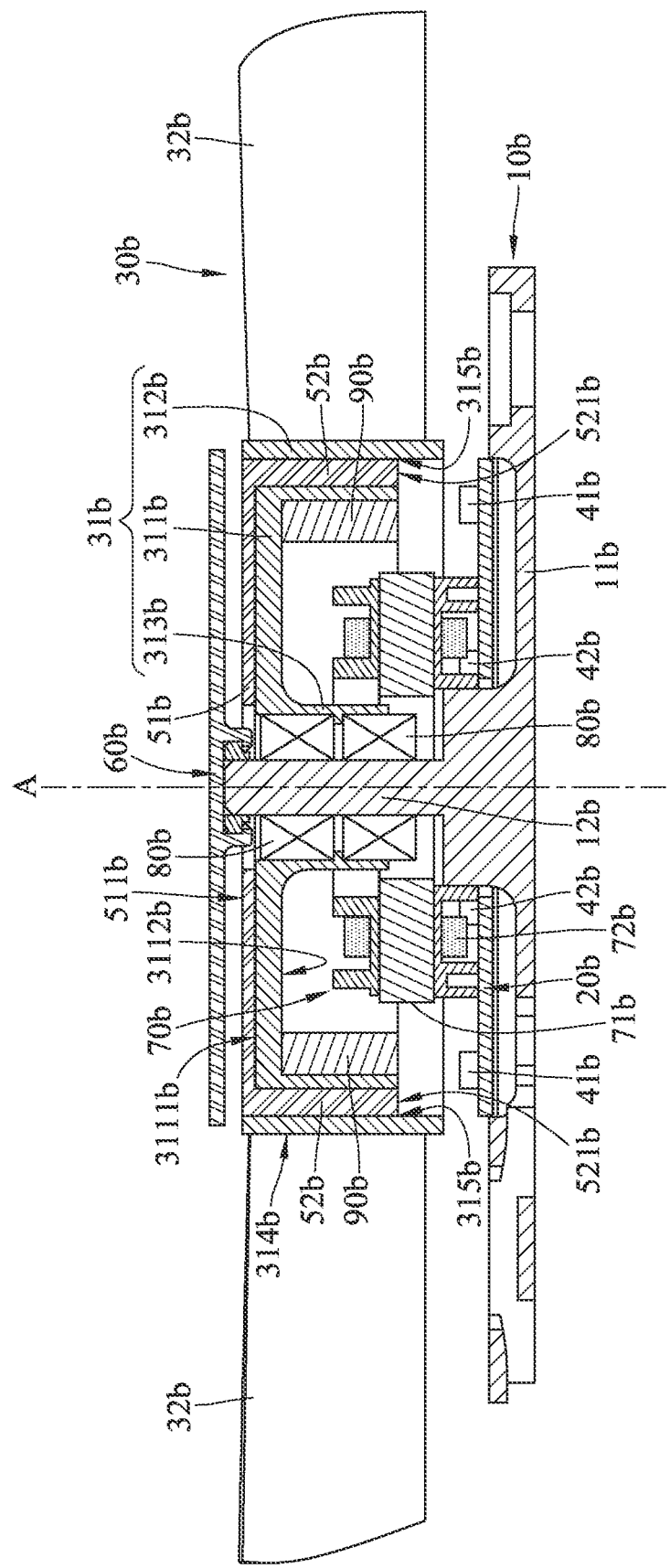
FIG. 6 is a cross-sectional view of the light emitting fan in FIG. 4.

Then, referring to FIGS. 4 to 6, there are shown a perspective view of a light emitting fan 1b according to a second embodiment of the disclosure, an exploded view of the light emitting fan 1b in FIG. 4, and a cross-sectional view of the light emitting fan 1b in FIG. 4.

In this embodiment, the light emitting fan 1b includes a frame 10b, a circuit board 20b, an impeller 30b, a plurality of light emitting components 40b, a light guiding component 50b, and a decorative board 60b. In this or another embodiment, the light emitting fan 1b may further includes a stator 70b, two bearings 80b, and a rotor 90b.

The frame 10b includes a bottom plate portion 11b and a pillar portion 12b protruding from the bottom plate portion 11b. The pillar portion 12b of the frame 10b is disposed through the circuit board 20b, and the stator 70b is fixed on the circuit board 20b. The stator 70b has a plurality of teeth 71b and a plurality of coils 72b. The coils 72b are respectively wound on the teeth 71a.

The impeller 30b includes a hub 31b and a plurality of blades 32b. The hub 31b includes a top plate portion 311b, an annular wall portion 312b, and a hollow pillar portion 313b. The top plate portion 311b of the hub 31b has an outer top surface 3111b and an inner top surface 3112b. The outer top surface 3111b of the top plate portion 311b is opposite to the inner top surface 3112b. The annular wall portion 312b and the hollow pillar portion 313b protrude from the inner top surface 3112b of the top plate portion 311b, and the annular wall portion 312b surrounds the hollow pillar portion 313b. The hollow pillar portion 313b of the hub 31b is rotatably disposed on the pillar portion 12b of the frame 10b via the bearings 80b, and the pillar portion 12b of the frame 10b sticks out of the outer top surface 3111b of the top plate portion 311b. In this embodiment, the hub 31b has an outer annular surface 314b on the annular wall portion 312b, and the outer annular surface 314b is connected to the outer top surface 3111b of the top plate portion 311b. The blades 32b are connected to the outer annular surface 314b of the hub 31b. In addition, the hub 31b further has a plurality of insertion holes 315b. Different portions of each of the insertion holes 315b are respectively located at the top plate portion 311b and the annular wall portion 312b. An end of each of the insertion holes 315b is connected to the outer top surface 3111b, and the insertion holes 315b extend towards the circuit board 20b. The rotor 90b is, for example, a permanent magnet. The rotor 90b is disposed on a side of the annular wall portion 312b of the hub 31b located close to the stator 70b.

The light emitting components 40b are, for example, light emitting diodes. The light emitting components 40b are disposed on a surface of the circuit board 20b facing the inner top surface 3112b of the top plate portion 311b. The light emitting components 40b includes a plurality of first light emitting components 41b and a plurality of second light emitting components 42b. The second light emitting components 42b are located closer to the pillar portion 12b of the frame 10b than the first light emitting components 41b; that is, the second light emitting components 42b are located closer to a rotation axis A of the hub 31b than the first light emitting components 41b.

The light guiding component 50b, for example, includes an additive, such as light diffusion powder. The light guiding component 50b includes a plate portion 51b and a plurality of protrusion portions 52b protruding from the same surface of the plate portion 51b along the same direction. In this embodiment, the pillar portion 12b of the frame 10b is disposed through the plate portion 51b of the light guiding component 50b. The protrusion portions 52b are respectively inserted into the insertion holes 315b, the plate portion 51b is stacked on the outer top surface 3111b of the top plate portion 311b of the hub 31b, and the top plate portion 311b of the hub 31b is located between the plate portion 51b and the circuit board 20b.

The decorative board 60b is, for example, made of a light permeable material that is transparent or translucent, such as acrylate, glass, or plastic. The decorative board 60b is fixed on an end of the pillar portion 12b that sticks out of the plate portion 51b of the light guiding component 50b, and the plate portion 51b of the light guiding component 50b is located between the decorative board 60b and the outer top surface 3111b of the top plate portion 311b. When the circuit board 20b conduct a current to flow through the coils 72b, the rotor 90b rotates relative to the stator 70b so as to rotate the impeller 30b relative to the frame 10b. During the rotation of the impeller 30b, since the decorative board 60b is fixed on the pillar portion 12b of the frame 10b, the decorative board 60b does not rotate along with the impeller 30b.

In this embodiment, the protrusion portions 52b of the light guiding component 50b each have a light incident surface 521b, and the plate portion 51b has a light emitting surface 511b. The light incident surfaces 521b face the circuit board 20b, and the light emitting surface 511b faces the decorative board 60b. In this embodiment, the sum of the areas of the light incident surfaces 521b is smaller than the area of the light emitting surface 511b, but the disclosure is not limited thereto; in some other embodiments, the sum of the areas of the light incident surfaces may be greater than or equal to the area of the light emitting surface.

Light emitted by the first light emitting components 41b and the second light emitting components 42b is incident on the light incident surfaces 521b of the protrusion portions 52b of the light guiding component 50b so as to enter into the light guiding component 50b. Then, light will be diffused in the light guiding component 50b and go out of the light guiding component 50b from the light emitting surface 511b of the plate portion 51b. Therefore, light is uniformly incident on the decorative board 60b, thereby achieving the uniform light emitting effect of the light emitting fan 1b.

In this embodiment, the second light emitting components 42b are located closer to the rotation axis A of the hub 31b than the first light emitting components 41b, such that the dark area in the hub 31b of the impeller 30b can be reduced. Therefore, light emitted by the first light emitting components 41b and the second light emitting components 42b is further uniformly incident on the light incident surfaces 521b of the protrusion portions 52b of the light guiding component 50b.

In this embodiment, there is, for example, a mark 100b disposed on the decorative board 60b. For example, the mark 100b is a letter, such as "A" as shown in FIG. 4. The mark 100b is formed on the decorative board 60b, for example, via a spray painting manner or adhering manner. Note that the form of the mark 100b is not intended to limit the disclosure and may be modified; in some other embodiments, the mark may be a trademark, a brand logo or in another suitable form. In still other embodiments, the mark 100*b* is optional and may be omitted.

Note that the quantities of the light emitting components 40*b*, the protrusion portions 52*b* of the light guiding component 50*b*, and the insertion holes 315*b* of the hub 31*b* are not intended to limit the disclosure; in some other embodiments, the quantity of each of the light emitting component, the protrusion portion of the light guiding component, and the insertion hole of the hub may be one.

Figure 7:
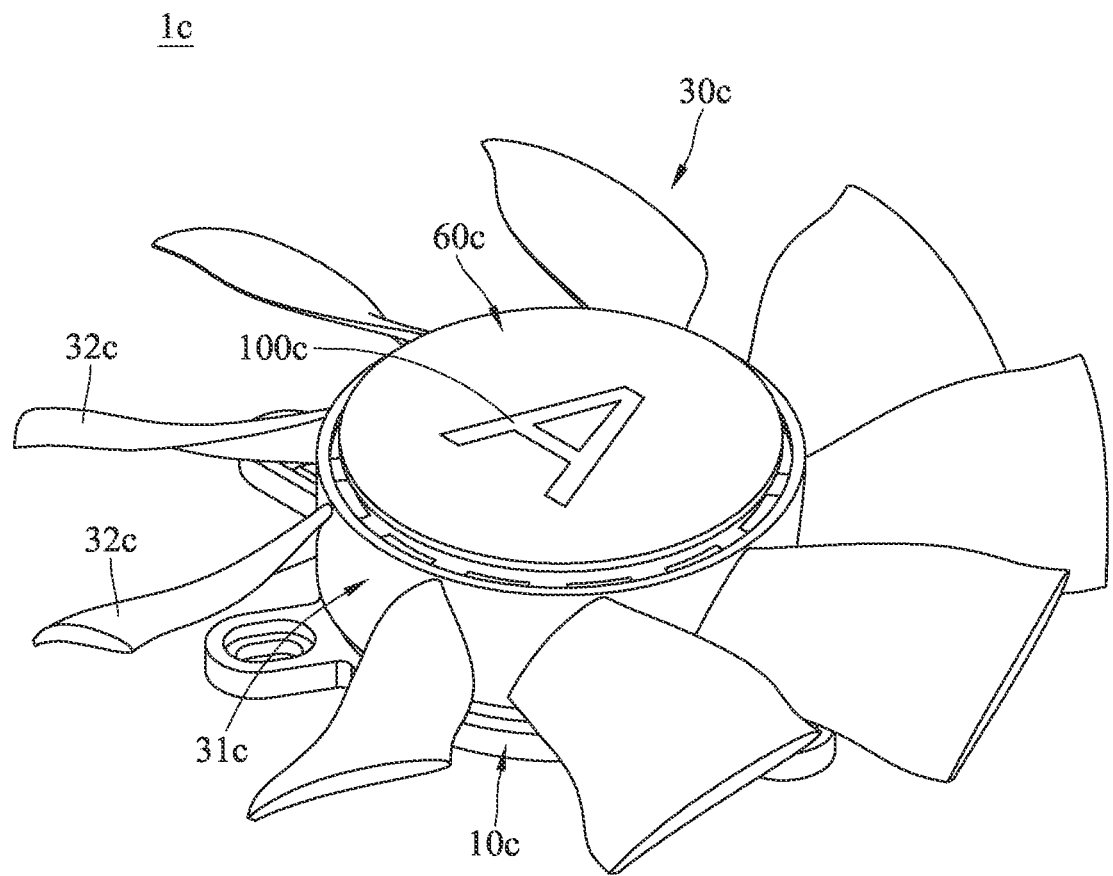
FIG. 7 is a perspective view of a light emitting fan according to a third embodiment of the disclosure.
Figure 8:
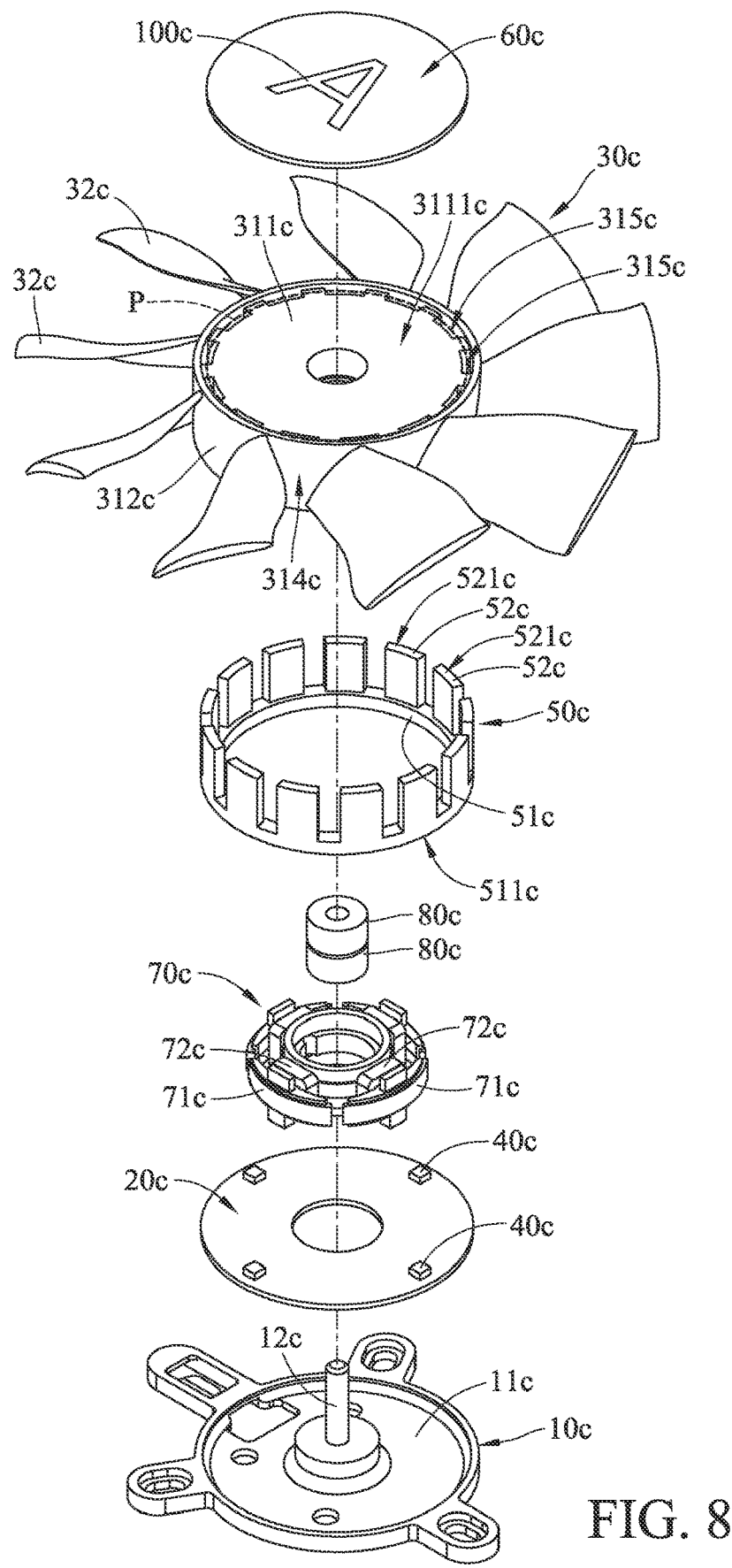
FIG. 8 is an exploded view of the light emitting fan in FIG. 7.
Figure 9:
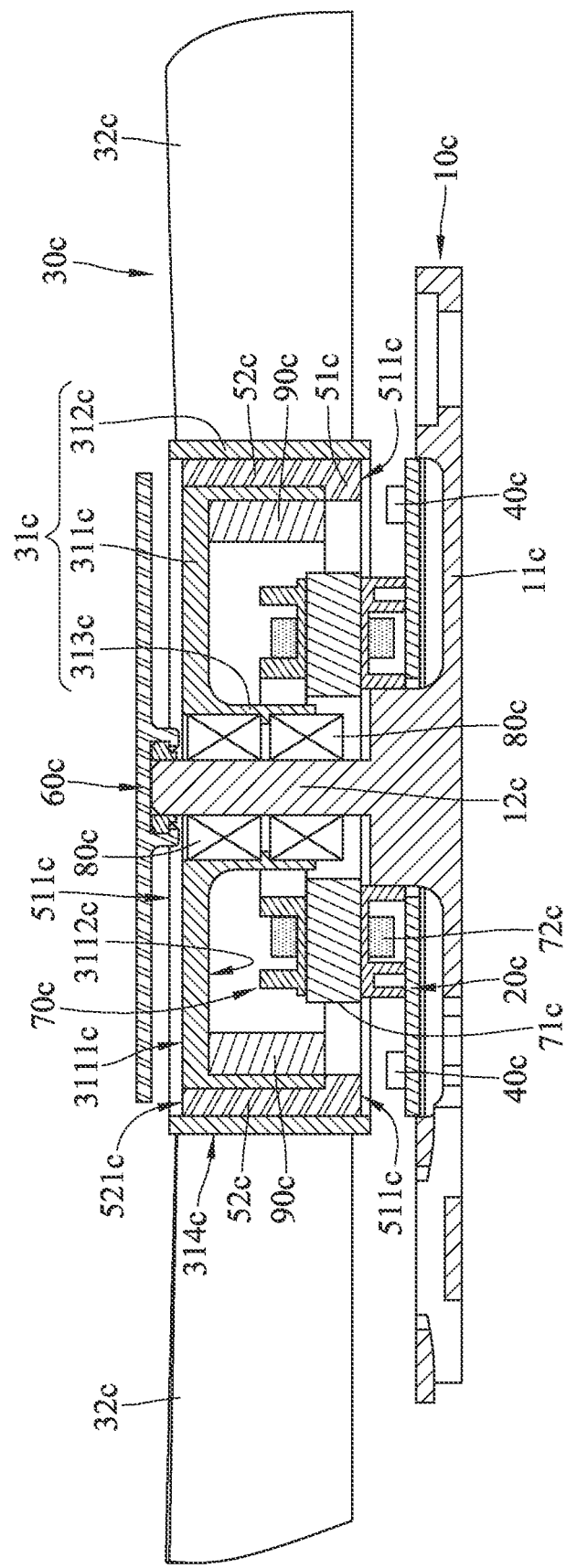
FIG. 9 is a cross-sectional view of the light emitting fan in FIG. 7.
Figure 10:
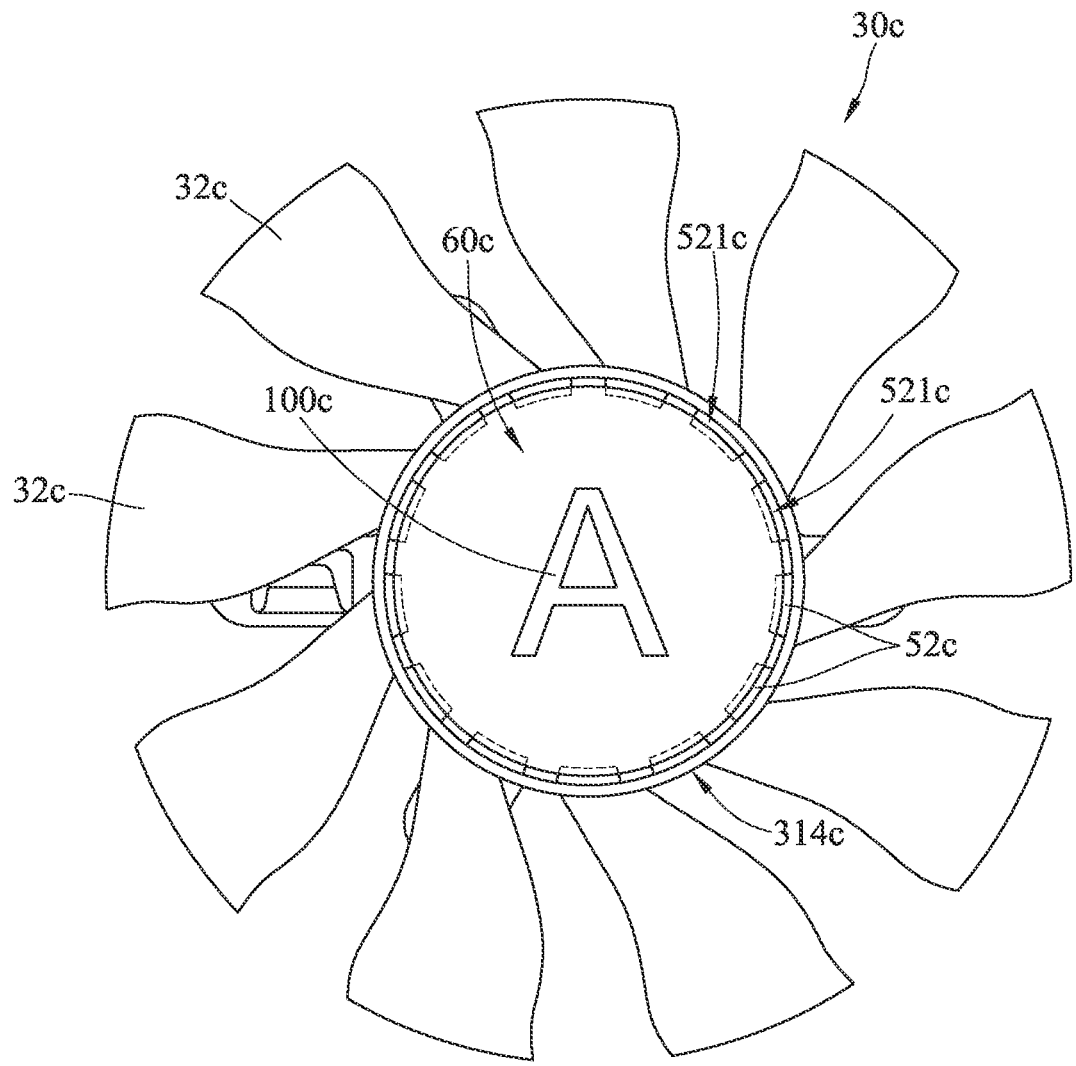
FIG. 10 is a top view of the light emitting fan in FIG. 7.

Then, referring to FIGS. 7 to 10, there are shown a perspective view of a light emitting fan 1*c* according to a third embodiment of the disclosure, an exploded view of the light emitting fan 1*c* in FIG. 7, a cross-sectional view of the light emitting fan 1*c* in FIG. 7, and a top view of the light emitting fan 1*c* in FIG. 7.

In this embodiment, the light emitting fan 1*c* includes a frame 10*c*, a circuit board 20*c*, an impeller 30*c*, a plurality of light emitting components 40*c*, a light guiding component 50*c*, and a decorative board 60*c*. In this or another embodiment, the light emitting fan 1*c* may further include a stator 70*c*, two bearings 80*c*, and a rotor 90*c*.

The frame 10*c* includes a bottom plate portion 11*c* and a pillar portion 12*c* protruding from the bottom plate portion 11*c*. The pillar portion 12*c* of the frame 10*c* is disposed through the circuit board 20*c*, and the stator 70*c* is fixed on the circuit board 20*c*. The stator 70*c* has a plurality of teeth 71*c* and a plurality of coil 72*c*, and the coils 72*c* are respectively wound on the teeth 71*c*.

The impeller 30*c* includes a hub 31*c* and a plurality of blades 32*c*. The hub 31*c* includes a top plate portion 311*c*, an annular wall portion 312*c*, and a hollow pillar portion 313*c*. The top plate portion 311*c* of the hub 31*c* has an outer top surface 3111*c* and an inner top surface 3112*c*. The outer top surface 3111*c* of the top plate portion 311*c* is opposite to the inner top surface 3112*c*. The annular wall portion 312*c* and the hollow pillar portion 313*c* protrude from the inner top surface 3112*c* of the top plate portion 311*c*, and the annular wall portion 312*c* surrounds the hollow pillar portion 313*c*. The hollow pillar portion 313*c* of the hub 31*c* is rotatably disposed on the pillar portion 12*c* of the frame 10*c* via the bearings 80*c*, and the pillar portion 12*c* of the frame 10*c* sticks out of the outer top surface 3111*c* of the top plate portion 311*c*. The inner top surface 3112*c* of the top plate portion 311*c* faces the circuit board 20*c*. In this embodiment, the hub 31*c* has an outer annular surface 314*c* on the annular wall portion 312*c*, and the outer annular surface 314*c* is connected to the outer top surface 3111*c* of the top plate portion 311*c*. The blades 32*c* are connected to the outer annular surface 314*c* of the hub 31*c*. In addition, the hub 31*c* further has a plurality of insertion holes 315*c*. Different portions of each of the insertion holes 315*c* are respectively located at the top plate portion 311*c* and the annular wall portion 312*c*. An end of each of the insertion holes 315*c* is connected to the outer top surface 3111*c*, and the insertion holes 315*c* extends towards the circuit board 20*c*. The rotor 90*c* is, for example, a permanent magnet. The rotor 90*c* is disposed on a side of the annular wall portion 312*c* of the hub 31*c* located close to the stator 70*c*.

The light emitting components 40*c* are, for example, light emitting diodes. The light emitting components 40*c* are disposed on a surface of the circuit board 20*c* facing the inner top surface 3112*c* of the top plate portion 311*c*.

The light guiding component 50*c*, for example, includes an additive, such as light diffusion powder. The light guiding component 50*c* includes a ring portion 51*c* and a plurality of protrusion portions 52*c* protruding from the same surface of the ring portion 51*c* along the same direction. The protrusion portions 52*c* are respectively inserted into the insertion holes 315*c*, and the ring portion 51*c* is located between the top plate portion 311*c* of the hub 31*c* and the circuit board 20*c*.

In this embodiment, the decorative board 60*c* is, for example, made of a light permeable material that is transparent or translucent, such as acrylate, glass, or plastic. The decorative board 60*c* is fixed on an end of the pillar portion 12*c* that sticks out of the outer top surface 3111*c* of the top plate portion 311*c*. When the circuit board 20*c* conducts a current to flow through the coils 72*c*, the rotor 90*c* rotates relative to the stator 70*c* so as to rotate the impeller 30*c* relative to the frame 10*c*. During the rotation of the impeller 30*c*, since the decorative board 60*c* is fixed on the pillar portion 12*c* of the frame 10*c*, the decorative board 60*c* does not rotate along with the impeller 30*c*.

In this embodiment, an orthogonal projection P of the decorative board 60*c* on the outer top surface 3111*c* of the top plate portion 311*c* partially overlaps with the insertion holes 315*c* of the hub 31*c*.

The ring portion 51*c* of the light guiding component 50*c* has a light incident surface 511*c*, and the protrusion portions 52*c* each have a light emitting surface 521*c*. The light incident surface 511*c* faces the circuit board 20*c*, and the light emitting surfaces 521*c* are exposed from the insertion holes 315*c*.

Light emitted by the light emitting components 40*c* is incident on the light incident surface 511*c* of the ring portion 51*c* of the light guiding component 50*c* so as to enter into the light guiding component 50*c*. Then, light will be diffused in the light guiding component 50*c* and go out of the light guiding component 50*c* from the light emitting surfaces 521*c* of the protrusion portions 52*c*. Therefore, light is uniformly incident on the decorative board 60*c*, thereby achieving the uniform light emitting effect of the light emitting fan 1*c*.

In this embodiment, there is, for example, a mark 100*c* disposed on the decorative board 60*c*. For example, the mark 100*c* is a letter, such as "A" as shown in FIG. 7. The mark 100*c* is formed on the decorative board 60*b* via, for example, a spray painting manner or adhering manner. Note that the form of the mark 100*c* is not intended to limit the disclosure and may be modified; in some other embodiments, the mark may be a trademark, a brand logo or in another suitable form. In still other embodiments, the mark 100*c* is optional and may be omitted.

Note that the quantities of the light emitting components 40*c*, the protrusion portions 52*c* of the light guiding component 50*c*, and the insertion holes 315*c* of the hub 31*c* are not intended to limit the disclosure; in some other embodiments, the quantity of each of the light emitting component, the protrusion portion of the light guiding component, and the insertion hole of the hub may be one.

Figure 11:
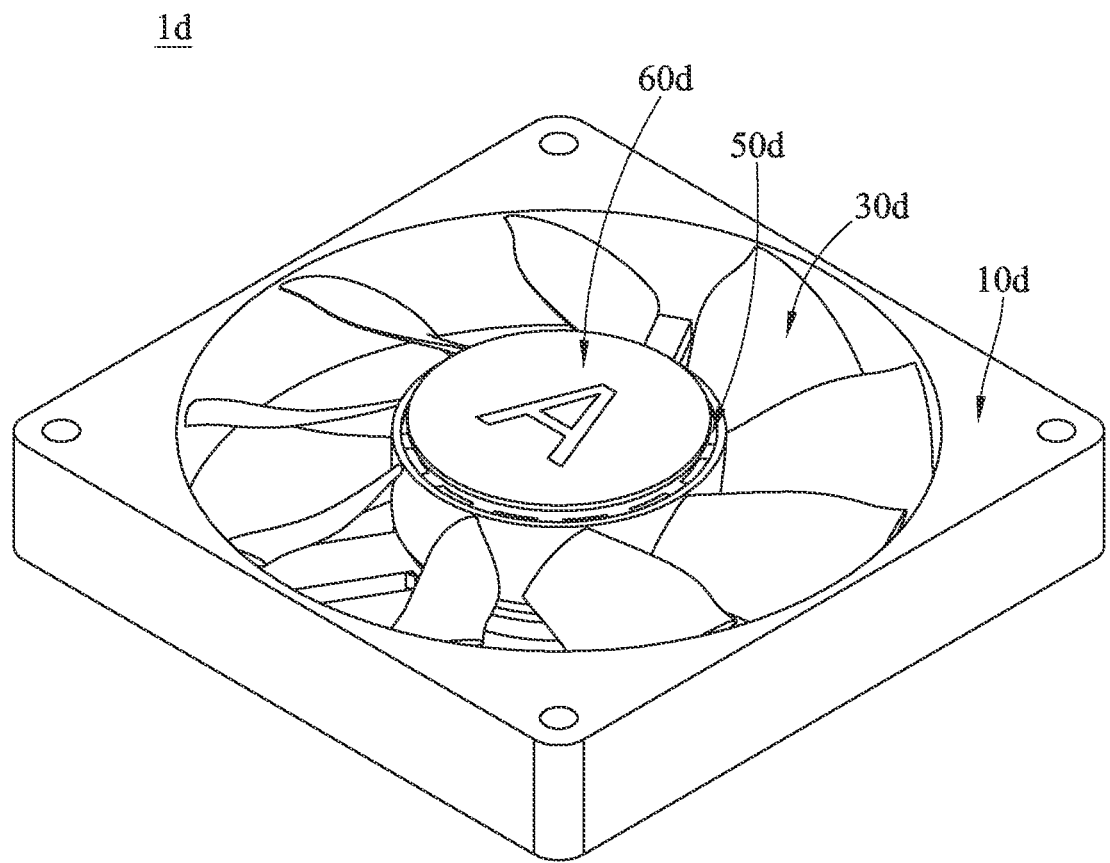
FIG. 11 is a perspective view of a light emitting fan according to a fourth embodiment of the disclosure.
Figure 12:
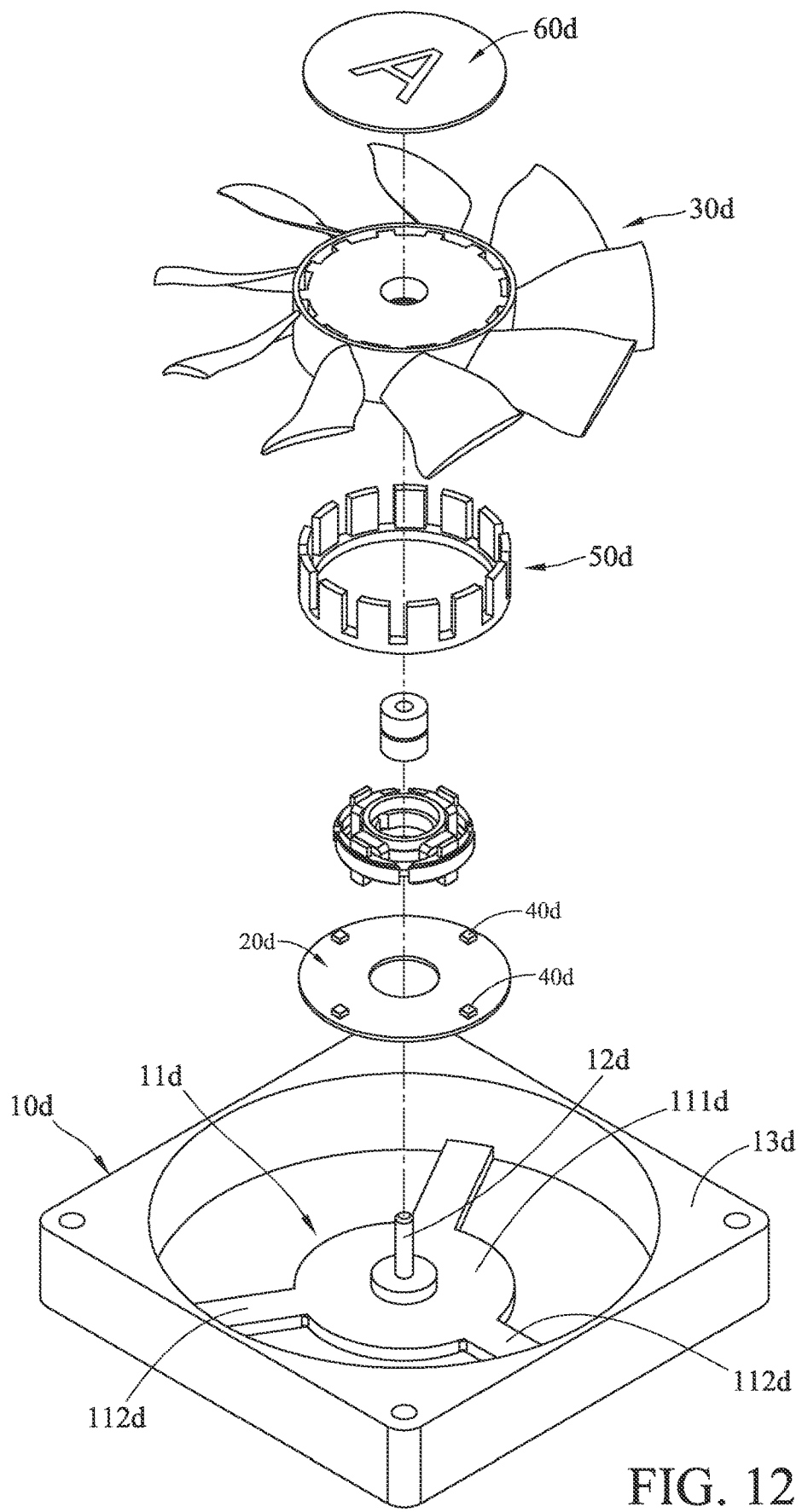
FIG. 12 is an exploded view of the light emitting fan in FIG. 11.

Then, referring to FIGS. 11 and 12, there are shown a perspective view of a light emitting fan 1*d* according to a fourth embodiment of the disclosure and an exploded view of the light emitting fan 1*d* in FIG. 11.

In this embodiment, the light emitting fan 1*d* is, for example, a computer fan. The light emitting fan 1*d* also includes a frame 10*d*, a circuit board 20*d*, an impeller 30*d*, a plurality of light emitting components 40*d*, a light guiding component 50*d*, and a decorative board 60*d*.

The light emitting fan 1*d* of this embodiment is similar to the light emitting fan 1*c* in FIG. 7, and the main difference between them is the structure of the frame. Therefore, the following paragraphs will only introduce the frame 10*d*, and the others parts will not be repeatedly introduced hereinafter.

In this embodiment, the frame 10d includes a bottom plate portion 11d, a pillar portion 12d, and a peripheral portion 13d. The bottom plate portion 11d includes a plate body 111d and a plurality of strips 112d. The pillar portion 12d protrudes from the plate body 111d of the bottom plate portion 11d. The strips 112d are located between and connected to the plate body 111d and the peripheral portion 13d. The peripheral portion 13d of the frame 10d surrounds the impeller 30d.

Note that the frame 10d is not restricted to be applied in the light emitting fan 1d; in some other embodiments, the light emitting fan in FIG. 1 or 4 may adopt the frame 10d.

Figure 13:
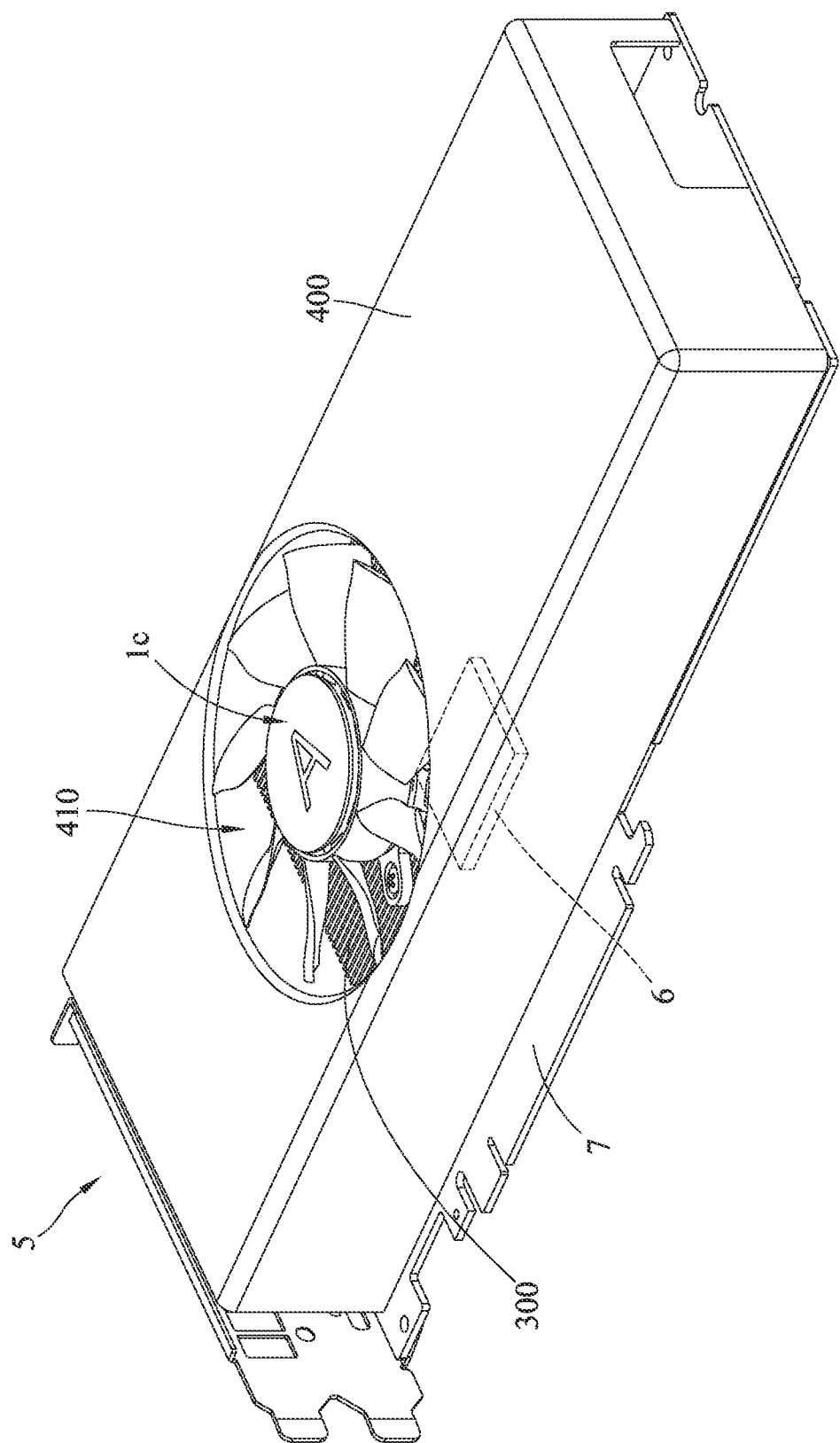
FIG. 13 is a perspective view of a heat dissipation device according to a fifth embodiment of the disclosure.
Figure 14:
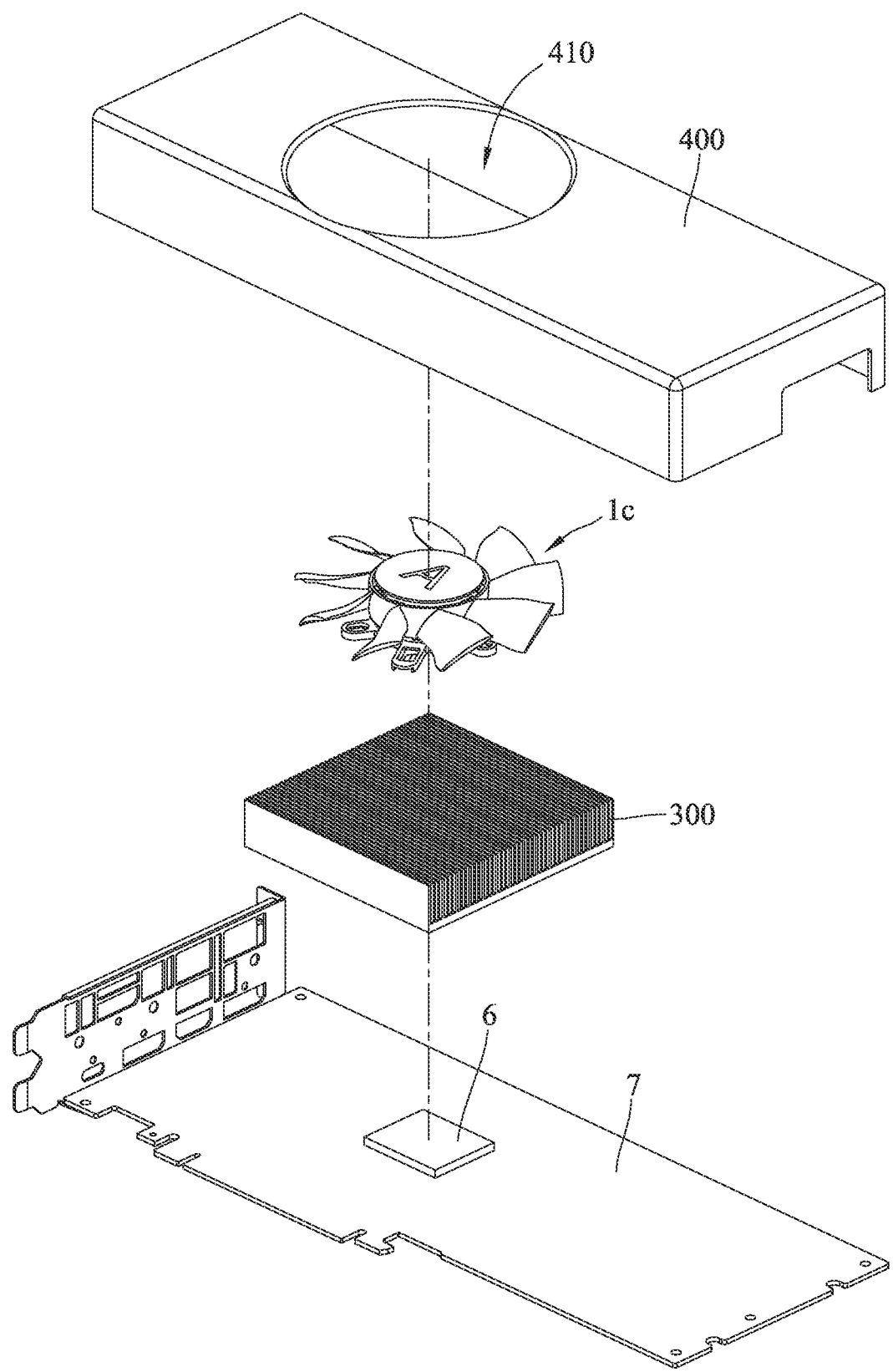
FIG. 14 is an exploded view of the heat dissipation device in FIG. 13.

Then, referring to FIGS. 13 and 14, there are shown a perspective view of a heat dissipation device 5 according to a fifth embodiment of the disclosure and an exploded view of the heat dissipation device 5 in FIG. 13.

In this embodiment, the heat dissipation device 5 is configured to be mounted on a heat source 6. The heat source 6 is, for example, a chip disposed on a circuit board 7 of a graphic card. The heat dissipation device 5 includes a heat sink 300 and a light emitting fan 1c.

The heat sink 300 is configured to be thermally coupled to the heat source 6. The light emitting fan 1c is similar to the light emitting fan 1c shown in FIG. 7, and thus the following descriptions will not repeatedly introduce the detail of the light emitting fan 1c. The light emitting fan 1c is, for example, an axial fan. The light emitting fan 1c is configured to be located at a side of the heat sink 300 located away from the heat source 6. In this embodiment, the heat dissipation device 5 further includes a cover 400. The cover 400 surrounds the light emitting fan 1c. The cover 400 has an air inlet 410. The light emitting fan 1c is configured to produce an airflow towards the heat sink 300 from the air inlet 410 of the cover so as to take the heat absorbed by the heat sink 300 away.

Note that the type of light emitting fan of the heat dissipation device 5 is not intended to limit the disclosure; in some other embodiments, the heat dissipation device may adopt the light emitting fan in FIG. 1 or 4.

According to the light emitting fans and the heat dissipation device discussed in the above embodiments, the light guiding component is integrated on the hub of the impeller, and light emitted by the light emitting component can be incident on the light guiding component, such that the light entering into the light guiding component is diffused. Therefore, the diffused light can be uniformly guided onto the decorative board by the light guiding component, thereby achieving the uniform light emitting effect of the light emitting fan.

In some embodiments, the sum of the areas of the light incident surfaces of the light guiding component is smaller than the area of the light emitting surface of the light guiding component, such that the light guiding component can guide the light onto the decorative board in a more uniform manner.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A light emitting fan, comprising:
a frame;
a circuit board, disposed on the frame;
an impeller, comprising a hub and a plurality of blades, wherein the hub is rotatably disposed on the frame, the hub has an outer top surface and an outer annular surface, the outer top surface faces away from the circuit board, the outer annular surface is connected to the outer top surface, the plurality of blades are connected to the outer annular surface of the hub;
a decorative board, fixed to the frame and located farther away from the circuit board than the outer top surface of the hub;
at least one light emitting component, disposed on the circuit board, and
a light guiding component;
wherein light emitted by the at least one light emitting component is incident on the decorative board via the light guiding component;
wherein the hub comprises a top plate portion and an annular wall portion, the outer top surface is located at the top plate portion, the top plate portion has an inner top surface opposite to the outer top surface, the annular wall portion protrudes from the inner top surface of the top plate portion, and the light guiding component is inserted into the top plate portion and the annular wall portion of the hub;
wherein the light emitting fan further comprises a stator and a rotor, the stator is disposed on the circuit board on which the at least one light emitting component is disposed, the stator is located between the top plate portion of the hub and the circuit board on which the at least one light emitting component is disposed, and the rotor is disposed on the hub.

2. The light emitting fan according to claim 1, wherein the hub has at least one insertion hole connected to the outer top surface and extending towards the circuit board, different portions of the at least one insertion hole are respectively located at the top plate portion and the annular wall portion, the light guiding component comprises a plate portion and at least one protrusion portion, the at least one protrusion portion protrudes from the plate portion, the at least one protrusion portion is inserted into the at least one insertion hole, the plate portion is stacked on the outer top surface of the hub, and the top plate portion of the hub is located between the plate portion and the circuit board.

3. The light emitting fan according to claim 1, wherein the hub has at least one insertion hole connected to the outer top surface and extending towards the circuit board, different portions of the at least one insertion hole are respectively located at the top plate portion and the annular wall portion, the light guiding component comprises a ring portion and at least one protrusion portion, the at least one protrusion portion protrudes from the ring portion, the at least one protrusion portion is inserted into the at least one insertion hole, and the ring portion is located between the top plate portion of the hub and the circuit board.

4. The light emitting fan according to claim 2, wherein the at least one insertion hole comprises a plurality of insertion holes, the at least one protrusion portion comprises a plurality of protrusion portions, the plurality of insertion holes are spaced apart from each other, the plurality of protrusion portions are respectively inserted into the plurality of insertion holes, each of the plurality of protrusion portions has a light incident surface facing the circuit board, the plate portion has a light emitting surface facing the decorative board, and a sum of areas of the light incident surfaces is smaller than an area of the light emitting surface.

5. The light emitting fan according to claim 3, wherein an orthogonal projection of the decorative board on the outer top surface of the hub partially overlaps with the at least one insertion hole.

6. A light emitting fan, comprising:
a frame;
a circuit board, disposed on the frame;
an impeller, comprising a hub and a plurality of blades, wherein the hub is rotatably disposed on the frame, the hub has an outer top surface, an outer annular surface, and at least one insertion hole, the outer top surface faces away from the circuit board, the outer annular surface is connected to the outer top surface, the plurality of blades are connected to the outer annular surface of the hub, an end of the at least one insertion hole is connected to the outer top surface, and the at least one insertion hole extends towards the circuit board;
a decorative board, fixed to the frame and located farther away from the circuit board than the outer top surface of the hub;
at least one light emitting component, disposed on the circuit board, and
a light guiding component, inserted into the at least one insertion hole of the hub;
wherein light emitted by the at least one light emitting component is incident on the decorative board via the light guiding component;
wherein the hub comprises a top plate portion and an annular wall portion, the outer top surface is located at the top plate portion, the top plate portion has an inner top surface opposite to the outer top surface, the annular wall portion protrudes from the inner top surface of the top plate portion, and the at least one insertion hole is located at the top plate portion;
wherein the light guiding component comprises a plate portion and at least one protrusion portion, the at least one protrusion portion protrudes from the plate portion, the at least one protrusion portion is inserted into the at least one insertion hole, the plate portion is stacked on the outer top surface of the hub, and the top plate portion of the hub is located between the plate portion and the circuit board, the plate portion of the light guiding component is located between the at least one protrusion portion of the light guiding component and the decorative board;
wherein the light emitting fan further comprises a stator and a rotor, the stator is disposed on the circuit board on which the at least one light emitting component is disposed, the stator is located between the top plate portion of the hub and the circuit board on which the at least one light emitting component is disposed, and the rotor is disposed on the hub.

7. The light emitting fan according to claim 6, wherein the at least one insertion hole comprises a plurality of insertion holes, the at least one protrusion portion comprises a plurality of protrusion portions, the plurality of insertion holes are spaced apart from each other, the plurality of protrusion portions are respectively inserted into the plurality of insertion holes, each of the plurality of protrusion portions has a light incident surface facing the circuit board, the plate portion has a light emitting surface facing the decorative board, and a sum of areas of the light incident surfaces is smaller than an area of the light emitting surface.

8. The light emitting fan according to claim 6, wherein the stator has a plurality of teeth, two of the plurality of teeth which are located adjacent to each other together form a through hole therebetween, and light emitted by the at least one light emitting component is incident on the light guiding component via the through hole.

9. A heat dissipation device, configured to be mounted on a heat source, the heat dissipation device comprising:
a heat sink, configured to be thermally coupled with the heat source; and
a light emitting fan, configured to be located at a side of the heat sink located away from the heat source, wherein the light emitting fan is configured to produce an airflow towards the heat sink, and the light emitting fan comprises:
a frame;
a circuit board, disposed on the frame;
an impeller, comprising a hub and a plurality of blades, wherein the hub is rotatably disposed on the frame, the hub has an outer top surface and an outer annular surface, the outer top surface faces away from the circuit board, the outer annular surface is connected to the outer top surface, the plurality of blades are connected to the outer annular surface of the hub;
a decorative board, fixed to the frame and located farther away from the circuit board than the outer top surface of the hub;
at least one light emitting component, disposed on the circuit board; and
a light guiding component;
wherein light emitted by the at least one light emitting component is incident on the decorative board via the light guiding component;
wherein the hub comprises a top plate portion and an annular wall portion, the outer top surface is located at the top plate portion, the top plate portion has an inner top surface opposite to the outer top surface, the annular wall portion protrudes from the inner top surface of the top plate portion, and the light guiding component is inserted into the top plate portion and the annular wall portion of the hub;
wherein the light emitting fan further comprises a stator and a rotor, the stator is disposed on the circuit board on which the at least one light emitting component is disposed, the stator is located between the top plate portion of the hub and the circuit board on which the at least one light emitting component is disposed, and the rotor is disposed on the hub.

10. The heat dissipation device according to claim 9, wherein the hub has at least one insertion hole connected to the outer top surface and extending towards the circuit board, different portions of the at least one insertion hole are respectively located at the top plate portion and the annular wall portion, the light guiding component comprises a plate portion and at least one protrusion portion, the at least one protrusion portion protrudes from the plate portion, the at least one protrusion portion is inserted into the at least one insertion hole, the plate portion is stacked on the outer top surface of the hub, and the top plate portion of the hub is located between the plate portion and the circuit board.

11. The heat dissipation device according to claim 9, wherein the hub has at least one insertion hole connected to the outer top surface and extending towards the circuit board, different portions of the at least one insertion hole are respectively located at the top plate portion and the annular wall portion, the light guiding component comprises a ring portion and at least one protrusion portion, the at least one protrusion portion protrudes from the ring portion, the at least one protrusion portion is inserted into the at least one insertion hole, and the ring portion is located between the top plate portion of the hub and the circuit board.

12. The heat dissipation device according to claim 11, wherein an orthogonal projection of the decorative board on the outer top surface of the hub partially overlaps with the at least one insertion hole.

13. The heat dissipation device according to claim 10, wherein the at least one insertion hole comprises a plurality of insertion holes, the at least one protrusion portion comprises a plurality of protrusion portions, the plurality of insertion holes are spaced apart from each other, the plurality of protrusion portions are respectively inserted into the plurality of insertion holes, each of the plurality of protrusion portions has a light incident surface facing the circuit board, the plate portion has a light emitting surface facing the decorative board, and a sum of areas of the light incident surfaces is smaller than an area of the light emitting surface.

14. A heat dissipation device, configured to be mounted on a heat source, the heat dissipation device comprising:
- a heat sink, configured to be thermally coupled with the heat source; and
- a light emitting fan, configured to be located at a side of the heat sink located away from the heat source, wherein the light emitting fan is configured to produce an airflow towards the heat sink, and the light emitting fan comprises:
  - a frame;
  - a circuit board, disposed on the frame;
  - an impeller, comprising a hub and a plurality of blades, wherein the hub is rotatably disposed on the frame, the hub has an outer top surface, an outer annular surface, and at least one insertion hole, the outer top surface faces away from the circuit board, the outer annular surface is connected to the outer top surface, the plurality of blades are connected to the outer annular surface of the hub, and an end of the at least one insertion hole is connected to the outer top surface, and the at least one insertion hole extends towards the circuit board;
  - a decorative board, fixed to the frame and located farther away from the circuit board than the outer top surface of the hub;
  - at least one light emitting component, disposed on the circuit board; and
  - a light guiding component, inserted into the at least one insertion hole of the hub;
- wherein light emitted by the at least one light emitting component is incident on the decorative board via the light guiding component;
- wherein the hub comprises a top plate portion and an annular wall portion, the outer top surface is located at the top plate portion, the top plate portion has an inner top surface opposite to the outer top surface, the annular wall portion protrudes from the inner top surface of the top plate portion, and the at least one insertion hole is located at the top plate portion;
- wherein the light guiding component comprises a plate portion and at least one protrusion portion, the at least one protrusion portion protrudes from the plate portion, the at least one protrusion portion is inserted into the at least one insertion hole, the plate portion is stacked on the outer top surface of the hub, and the top plate portion of the hub is located between the plate portion and the circuit board, the plate portion of the light guiding component is located between the at least one protrusion portion of the light guiding component and the decorative board;
- wherein the light emitting fan further comprises a stator and a rotor, the stator is disposed on the circuit board on which the at least one light emitting component is disposed, the stator is located between the top plate portion of the hub and the circuit board on which the at least one light emitting component is disposed, and the rotor is disposed on the hub.

15. The heat dissipation device according to claim 14, wherein the at least one insertion hole comprises a plurality of insertion holes, the at least one protrusion portion comprises a plurality of protrusion portions, the plurality of insertion holes are spaced apart from each other, the plurality of protrusion portions are respectively inserted into the plurality of insertion holes, each of the plurality of protrusion portions has a light incident surface facing the circuit board, the plate portion has a light emitting surface facing the decorative board, and a sum of areas of the light incident surfaces is smaller than an area of the light emitting surface.

* * * * *